(12) United States Patent
Chao et al.

(10) Patent No.: US 12,235,572 B2
(45) Date of Patent: Feb. 25, 2025

(54) OPTICAL ELEMENT DRIVING MECHANISM

(71) Applicant: TDK TAIWAN CORP., Taoyuan (TW)

(72) Inventors: Chen-Hung Chao, Taoyuan (TW); Yi-Chieh Lin, Taoyuan (TW); Tsung-Han Wu, Taoyuan (TW); Shou-Jen Liu, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 628 days.

(21) Appl. No.: 17/541,948

(22) Filed: Dec. 3, 2021

(65) Prior Publication Data
US 2022/0179163 A1   Jun. 9, 2022

Related U.S. Application Data

(60) Provisional application No. 63/121,415, filed on Dec. 4, 2020.

(51) Int. Cl.
| | | |
|---|---|---|
| *G02B 7/02* | (2021.01) | |
| *G01D 5/14* | (2006.01) | |
| *G02B 7/09* | (2021.01) | |
| *G03B 9/10* | (2021.01) | |
| *G03B 9/40* | (2021.01) | |
| *G03B 11/04* | (2021.01) | |
| *G03B 30/00* | (2021.01) | |
| *H01F 7/08* | (2006.01) | |
| *H01F 7/16* | (2006.01) | |

(Continued)

(52) U.S. Cl.
CPC ............... *G03B 9/40* (2013.01); *G01D 5/14* (2013.01); *G02B 7/02* (2013.01); *G02B 7/09* (2013.01); *G03B 9/10* (2013.01); *G03B 11/043* (2013.01); *G03B 30/00* (2021.01); *H01F 7/081* (2013.01); *H01F 7/16* (2013.01); *H04N 23/54* (2023.01); *H04N 23/55* (2023.01)

(58) Field of Classification Search
CPC ... G03B 9/40; G03B 9/10; G03B 9/14; G03B 30/00; G01D 5/14; G02B 7/02; G02B 7/09; G02B 26/08; G02B 5/005; G02B 26/02; G02B 7/00; H01F 7/14; H01F 7/081; H01F 7/16; H04N 23/54; H04N 23/55
See application file for complete search history.

(56) References Cited

U.S. PATENT DOCUMENTS 4,964,697 A * 10/1990 Fuziwara ............. G02B 7/10
396/542
2017/0245370 A1* 8/2017 Wang ............... B29C 45/14639
(Continued)

*Primary Examiner* — Mustak Choudhury
(74) *Attorney, Agent, or Firm* — MUNCY, GEISSLER, OLDS & LOWE, P.C.

(57) ABSTRACT

An optical element driving mechanism is provided, including a movable part, a fixed part, a driving assembly, a circuit assembly, and a connecting element. The movable part is for connecting an optical element. The fixed part includes an outer frame and a base, wherein the movable part is movable relative to the fixed part. The driving assembly is for generating a driving force to drive the movable part to move relative to the fixed part. The circuit assembly is for connecting to an external circuit. The circuit assembly includes a first terminal. The outer frame is fixedly connected to the base via the connecting element.

19 Claims, 15 Drawing Sheets

(51) Int. Cl.
*H04N 23/54* (2023.01)
*H04N 23/55* (2023.01)

(56) References Cited

U.S. PATENT DOCUMENTS

2018/0031854 A1* 2/2018 Hu .......................... G03B 3/10
2020/0174274 A1* 6/2020 Wang ................... G02B 27/646

* cited by examiner

OPTICAL ELEMENT DRIVING MECHANISM

CROSS REFERENCE TO RELATED APPLICATIONS

This application claims the benefit of U.S. Provisional Application No. 63/121,415, filed Dec. 4, 2020, the entirety of which is incorporated by reference herein.

BACKGROUND OF THE INVENTION

Field of the Invention

The present disclosure is related to an optical element driving mechanism, and more particularly to an optical element driving mechanism of an electrical device.

Description of the Related Art

As the relevant technologies have been developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

To solve the problems of the prior art, an optical element driving mechanism is provided, including a movable part, a fixed part, a driving assembly, a circuit assembly, and a connecting element. The movable part is used for connecting an optical element. The fixed part includes an outer frame and a base, wherein the movable part is movable relative to the fixed part. The driving assembly is for generating a driving force to drive the movable part to move relative to the fixed part. The circuit assembly is for connecting to an external circuit. The circuit assembly includes a first terminal. The outer frame is fixedly connected to the base via the connecting element.

In some embodiments of the present disclosure, the base includes a base body, a first terminal accommodating portion, and a first opening portion. The base body has a plate-like structure and being perpendicular to the main axis. The first terminal accommodating portion is for accommodating the first terminal. The first terminal is exposed to the outside through the first opening portion. The first terminal accommodating portion has an open structure. The first terminal accommodating portion has a closed perforation structure.

In some embodiments of the present disclosure, the first terminal accommodating portion further includes a first surface facing the first terminal. The first terminal accommodating portion further includes a second surface facing the first terminal. The first surface and the second surface face in opposite directions.

In some embodiments of the present disclosure, the first opening portion has a first opening surface facing the first terminal. The first opening surface and the first surface face the same direction. The shortest distance between the first opening surface and the first terminal is greater than the shortest distance between the first surface and the first terminal.

In some embodiments of the present disclosure, the base further includes a first supporting portion for supporting the first terminal. The first supporting portion has a first supporting portion surface facing the first terminal. The first supporting portion protrudes from the first opening portion. The first supporting portion surface does not at least partially overlap the second surface when viewed along a direction that is perpendicular to the first supporting portion surface.

In some embodiments of the present disclosure, the shortest distance between the first opening surface and the first terminal is greater than the shortest distance between the first supporting portion surface and the first terminal. The shortest distance between the first supporting portion surface and the first terminal is greater than the shortest distance between the first surface and the first terminal.

In some embodiments of the present disclosure, the first terminal is fixedly connected to the first supporting portion surface via the connecting element. The connecting element is in direct contact with the first surface. The connecting element is not in direct contact with the first opening surface.

In some embodiments of the present disclosure, the circuit assembly further includes a second terminal, and the base further includes a second terminal accommodating portion, a second opening portion, a first spacing structure, and a second spacing structure. The second terminal accommodating portion is for accommodating a second terminal of the circuit assembly. The second terminal is exposed to the outside through the second opening portion. The first spacing structure is located between the first terminal accommodating portion and the second terminal accommodating portion. The second spacing structure is located between the first terminal accommodating portion and the second terminal accommodating portion.

In some embodiments of the present disclosure, the first spacing structure protrudes from the first opening surface. The second spacing structure protrudes from the first surface. The connecting element is in direct contact with the second spacing structure.

In some embodiments of the present disclosure, the base further includes a first positioning structure, a third spacing structure, and a driving assembly corresponding structure. The first positioning structure is for positioning the first terminal. The third spacing structure is located between the first terminal and the second terminal. The driving assembly corresponding structure corresponds to the driving assembly and protrudes from the base body.

In some embodiments of the present disclosure, the connecting element is in direct contact with the first positioning structure. The first positioning structure has a protruding structure. The third spacing structure protrudes from the second spacing structure. The connecting element is in direct contact with the third spacing structure. The connecting element is in direct contact with the driving assembly corresponding structure.

In some embodiments of the present disclosure, the outer frame further includes a first outer frame top wall and an outer frame sidewall, wherein the first outer frame top wall has a plate-like structure, and the outer frame sidewall has a plate-like structure, wherein the first outer frame top wall and the outer frame sidewall are not parallel to each other.

In some embodiments of the present disclosure, the base further includes a fourth spacing structure, wherein the fourth spacing structure extends from the third spacing structure and is located between the first terminal and the second terminal.

In some embodiments of the present disclosure, the base further includes a first magnetic element supporting block, and the first magnetic element supporting block is in contact with the fourth spacing structure.

In some embodiments of the present disclosure, the driving assembly includes a first magnetic element, and the first magnetic element supporting block corresponds to the first magnetic element.

In some embodiments of the present disclosure, the first magnetic element supporting block and the first magnetic element at least partially overlap when viewed along the main axis.

In some embodiments of the present disclosure, the driving assembly further includes a second magnetic element, and the base further includes a second magnetic element supporting block. The second magnetic element supporting block corresponds to the second magnetic element.

In some embodiments of the present disclosure, the second magnetic element supporting block and the second magnetic element at least partially overlap when viewed along the main axis.

In some embodiments of the present disclosure, the width of the first magnetic element supporting block is shorter than the width of the second magnetic element supporting block.

In some embodiments of the present disclosure, the distance between the first magnetic element supporting block and the outer frame sidewall is greater than the distance between the second magnetic element supporting block and outer frame sidewall.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the present disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
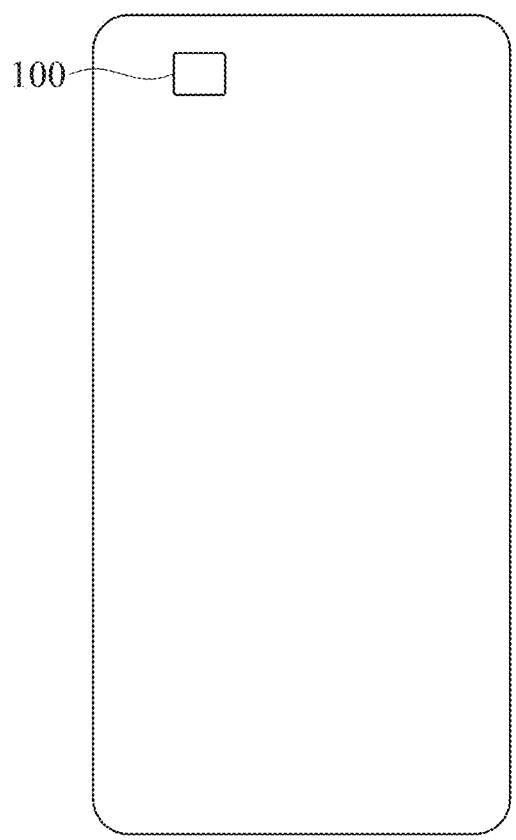
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 9-100 and the electrical device 9-1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1.

Figure 2:
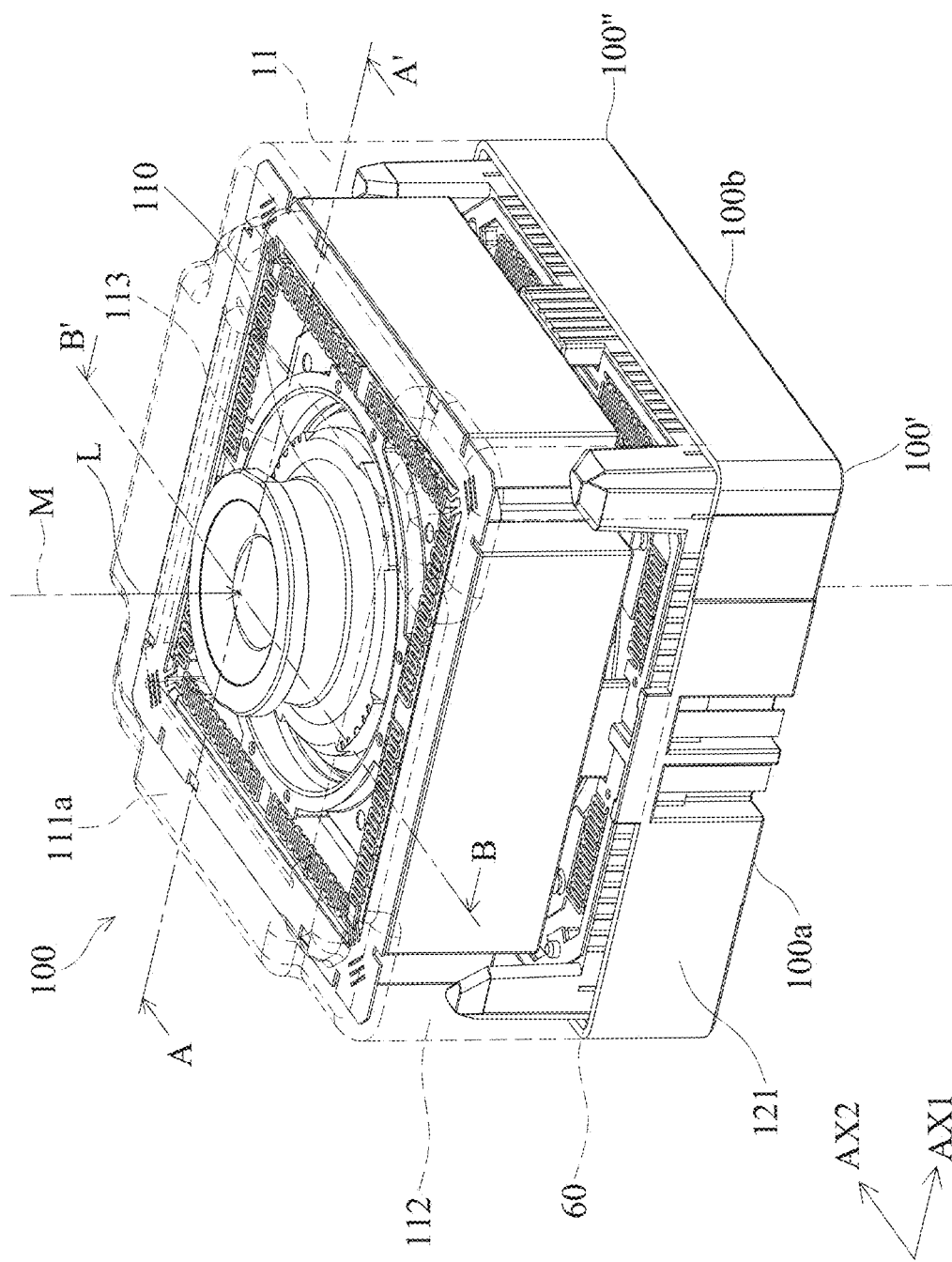
FIG. 2 is a schematic view of the optical element driving mechanism according to some embodiments of the present disclosure, in which the outer frame is shown as a dashed line.
Figure 3:
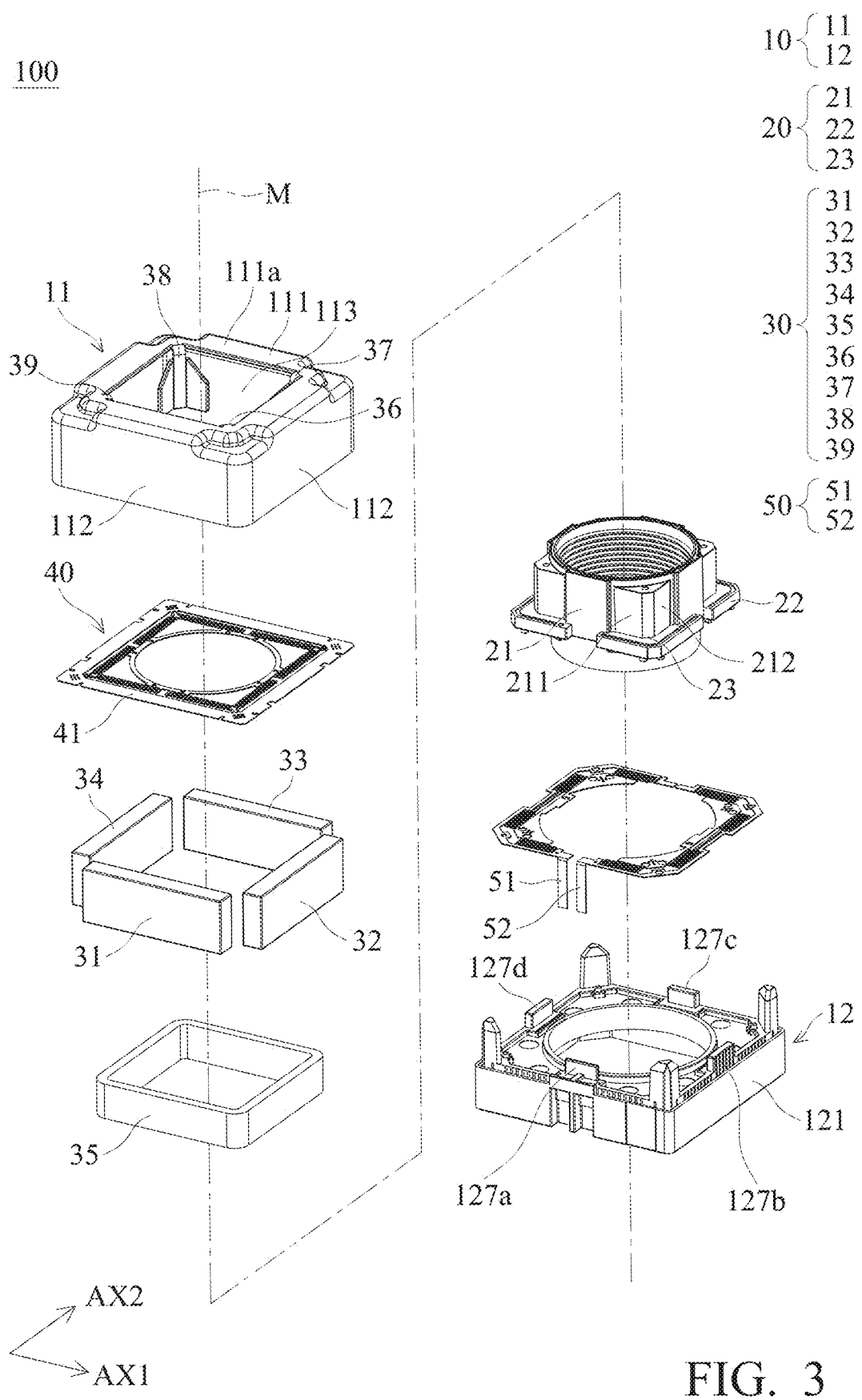
FIG. 3 is an exploded view of the optical element driving mechanism according to some embodiments of the present disclosure.

Please refer to FIG. 2 and FIG. 3. FIG. 2 is a schematic view of the optical element driving mechanism 100 according to some embodiments of the present disclosure, in which the outer frame is shown as a dashed line. FIG. 3 is an exploded view of the optical element driving mechanism 100 according to some embodiments of the present disclosure.

As shown in FIG. 2 and FIG. 3, the optical element driving mechanism 100 may include a fixed part 10, a movable part 20, a driving assembly 30, an elastic assembly 40, a circuit assembly 50, and a connecting element 60.

According to some embodiments of the present disclosure, the optical element driving mechanism 100 may have a polygonal structure when viewed along the main axis M. Moreover, the optical element driving mechanism 100 may have a first side 100a, a second side 100b, a first corner 100', and a second corner 100".

According to some embodiments of the present disclosure, the first side 100a of the optical element driving mechanism 100 may be parallel to the first axis AX1. According to some embodiments of the present disclosure, the second side 100b of the optical element driving mechanism 100 may be parallel to a second axis AX2.

According to some embodiments of the present disclosure, the first corner 100' of the optical element driving mechanism 100 may be located between the first side 100a and second side 100b of the optical element driving mechanism 100. According to some embodiments of the present disclosure, the second side 100b of the optical element driving mechanism 100 may be located between the first corner 100' and the second corner 100" of the optical element driving mechanism 100.

According to some embodiments of the present disclosure, the main axis M, the first axis AX1 and the second axis AX2 overlap each other. According to some embodiments of the present disclosure, the main axis M, the first axis AX1, and the second axis AX2 are perpendicular to each other.

The fixed part 10 may include an outer frame 11 and a base 12. The movable part 20 may move relative to the fixed part 10, and the movable part 20 may be connected to an optical element 110. The movable part 20 may include a movable part body 21, a driving assembly fixing structure 22, and a movable part accommodation 23.

The driving assembly 30 may generate a driving force to drive the movable part 20 to move relative to the fixed part 10. The driving assembly 30 may include a first magnetic element 31, a second magnetic element 32, a third magnetic element 33, a fourth magnetic element 34, a driving coil 35, a first reinforcement element 36, a second reinforcement element 37, a third reinforcement element 38, and a fourth reinforcement element 39.

The elastic assembly 40 may connect the movable part 20 to the fixed part 10. The elastic assembly 40 may include a first elastic element 41. The circuit assembly 50 may be connected to an external circuit, and the circuit assembly 50 may include a first terminal 51 and a second terminal 52.

The outer frame 11 may include a first outer frame top wall 111, an outer frame sidewall 112, and an outer frame opening 113.

Figure 4:
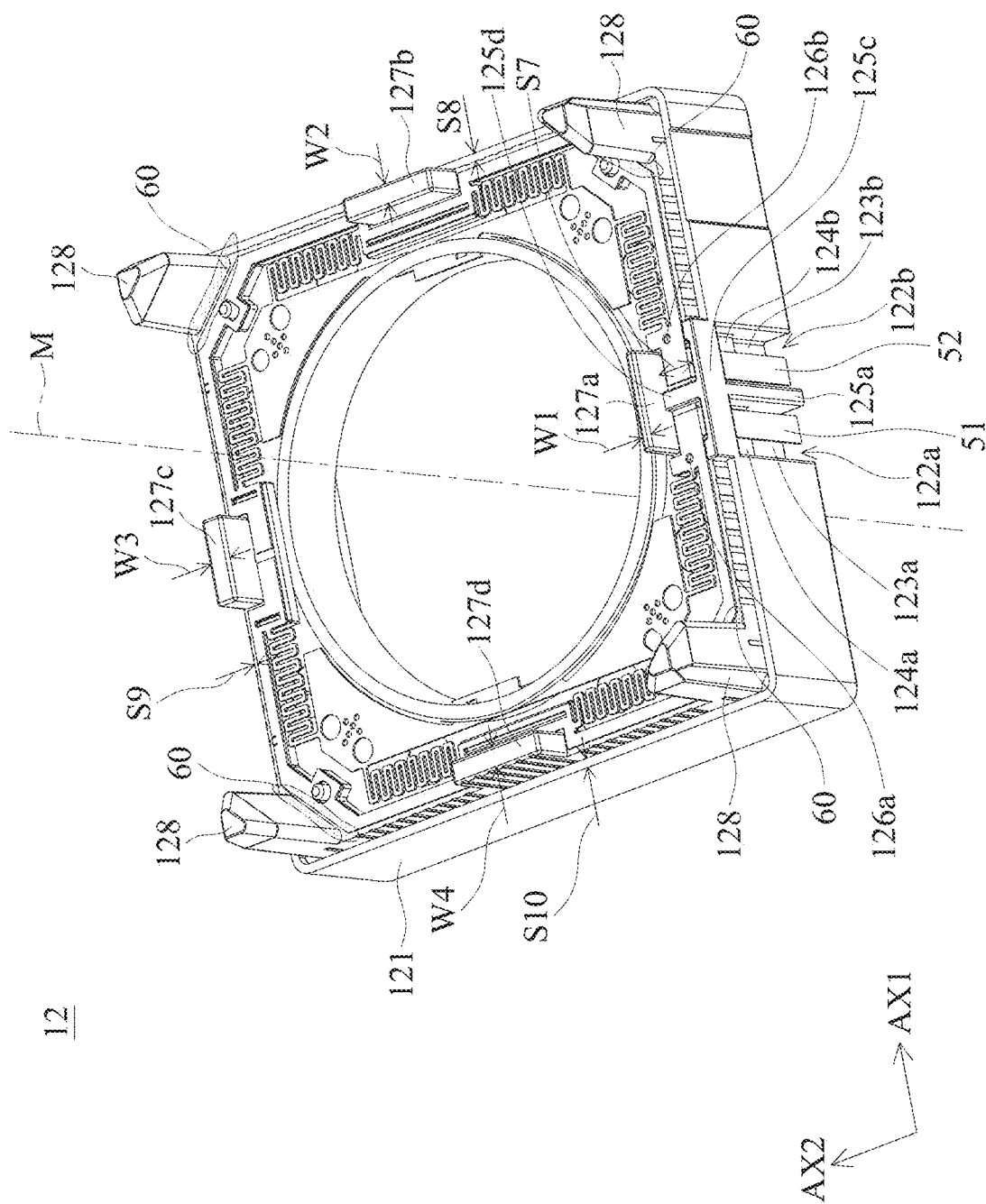
FIG. 4 is a schematic view of the base and the circuit assembly of the optical element driving mechanism according to some embodiments of the present disclosure.
Figure 5:
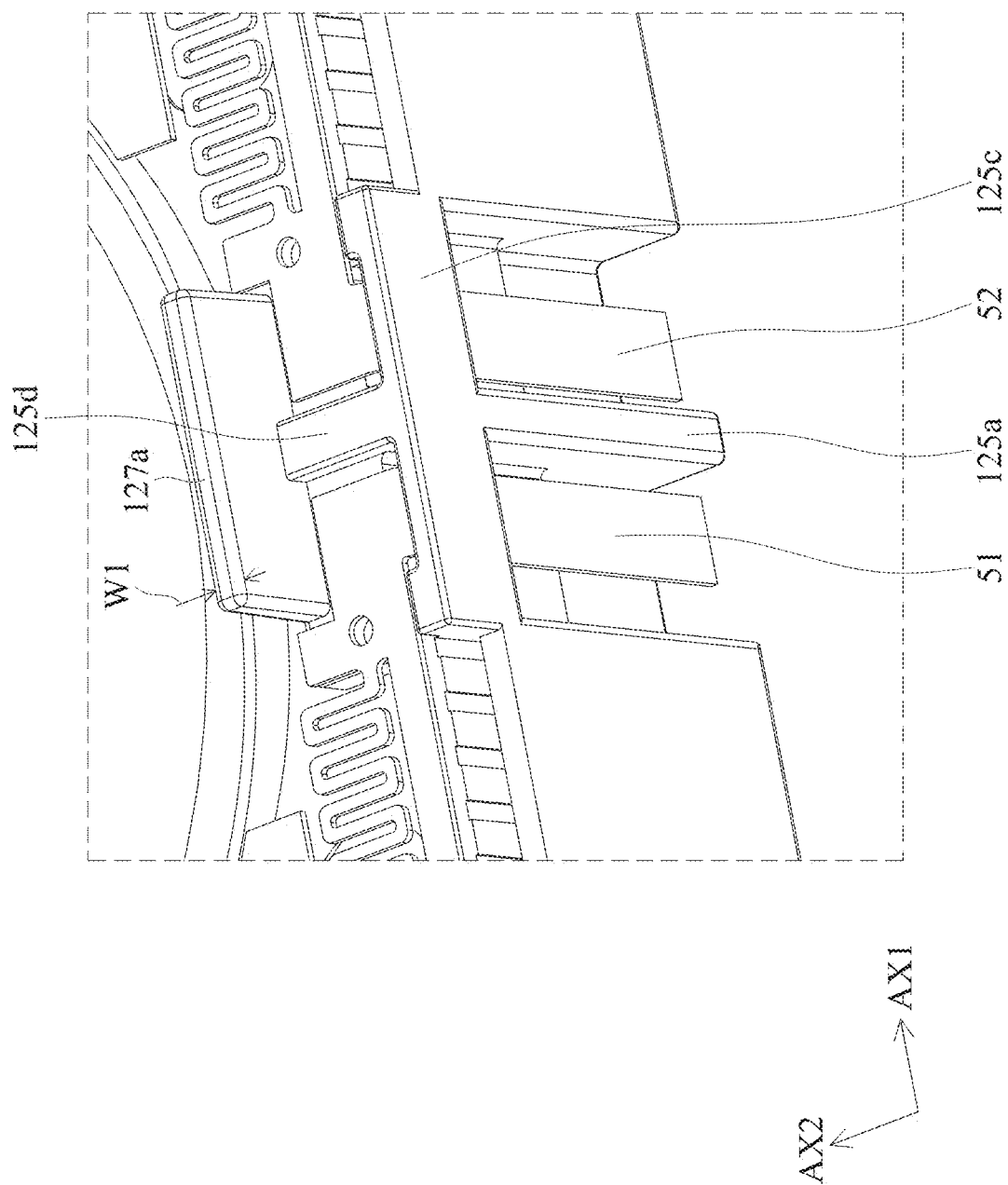
FIG. 5 is an enlarged schematic view of the base and the circuit assembly of the optical element driving mechanism according to some embodiments of the present disclosure.
Figure 6:
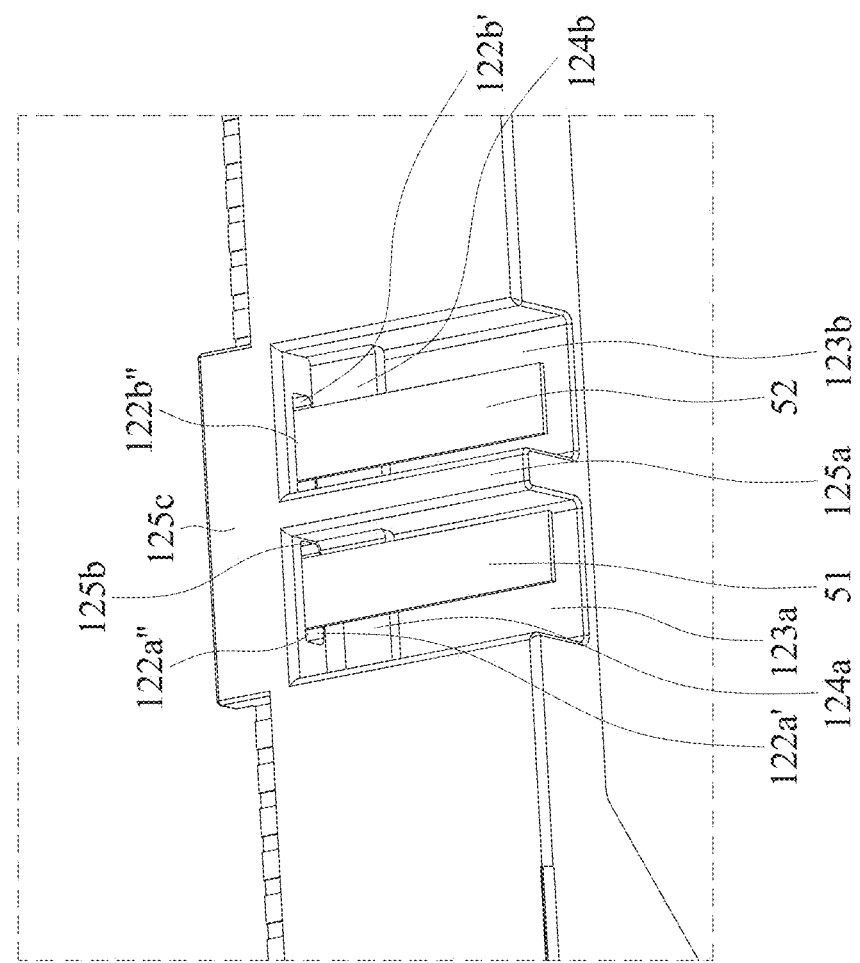
FIG. 6 is an enlarged schematic view of the base and the circuit assembly of the optical element driving mechanism according to some embodiments of the present disclosure.
Figure 7:
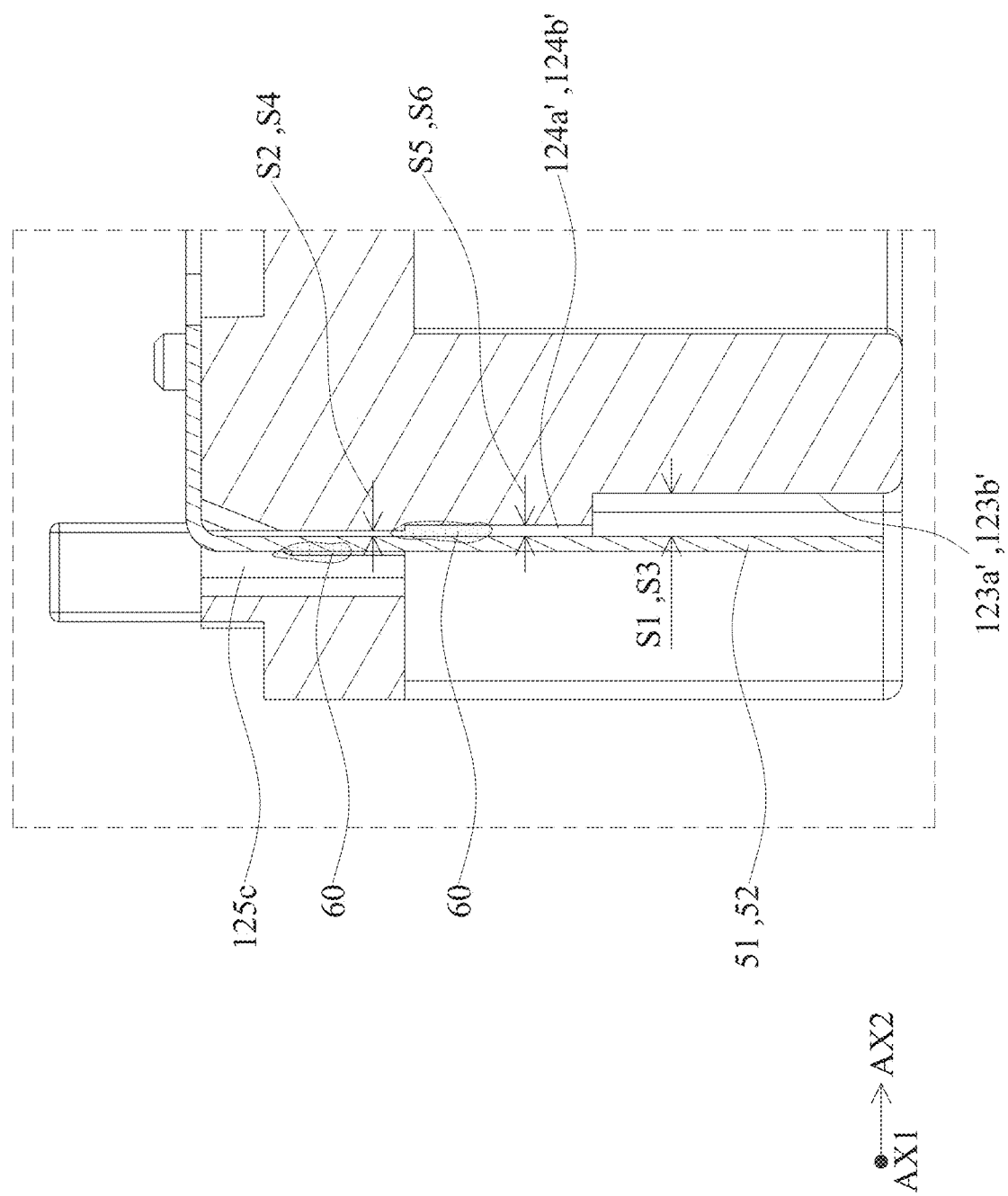
FIG. 7 is an enlarged sectional view of the base and the circuit assembly of the optical element driving mechanism according to some embodiments of the present disclosure.

Please refer to FIG. 4, FIG. 5, FIG. 6, and FIG. 7. FIG. 4 is a schematic view of the base 12 and the circuit assembly 50 of the optical element driving mechanism 100 according to some embodiments of the present disclosure; FIG. 5 is an enlarged schematic view of the base 12 and the circuit assembly 50 of the optical element driving mechanism 100 according to some embodiments of the present disclosure; FIG. 6 is an enlarged schematic view of the base 12 and the circuit assembly 50 of the optical element driving mechanism 100 according to some embodiments of the present disclosure; FIG. 7 is an enlarged sectional view of the base 12 and the circuit assembly of the optical element driving mechanism 100 according to some embodiments of the present disclosure.

As shown in the figure, the base 12 may include a base body 121, a terminal accommodation 122, an opening portion 123, a supporting portion 124, a spacing structure 125, a positioning structure 126, a magnetic element supporting block 127, and a driving assembly corresponding structure 128.

The terminal accommodation 122 may include a first terminal accommodation 122a and a second terminal accommodation 122b. The opening portion 123 may include a first opening portion 123a and a second opening portion 123b. The supporting portion 124 may include a first supporting portion 124a and a second supporting portion 124b.

The spacing structure 125 may include a first spacing structure 125a, a second spacing structure 125b, a third spacing structure 125c, and a fourth spacing structure 125d. The positioning structure 126 may include a first positioning structure 126a and a second positioning structure 126b.

The magnetic element supporting block 127 may include a first magnetic element supporting block 127a, a second magnetic element supporting block 127b, a third magnetic element supporting block 127c, and a fourth magnetic element supporting block 127d.

According to some embodiments of the present disclosure, the base body 121 may have a plate-like structure, and the base body 121 may be perpendicular to the main axis M. The outer frame sidewall 112 may be disposed on the base body 121, and the first outer frame top wall 111 may be disposed on the outer frame sidewall 112 (FIG. 2). According to some embodiments of the present disclosure, the outer frame the outer frame sidewall 112 11 may be fixedly connected to the base body 121 of the base 12 via the connecting element 60 (FIG. 4).

According to some embodiments of the present disclosure, the first outer frame top wall 111 may have a plate-like structure, and the first outer frame top wall 111 may be perpendicular to the main axis M. According to some embodiments of the present disclosure, the outer frame sidewall 112 may have a plate-like structure, and the outer frame sidewall 112 and the first outer frame top wall 111 may not be parallel to each other.

For example, according to some embodiments of the present disclosure, the outer frame sidewall 112 may be perpendicular or substantially perpendicular to the first outer frame top wall 111. Moreover, according to some embodiments of the present disclosure, the outer frame sidewall 112 may be parallel to the main axis M.

Please refer to FIG. 2, the outer frame opening 113 is formed on the first outer frame top wall 111, and the outer frame opening 113 may allow light L to pass through, so that the light L may enter the optical element 110 for imaging.

As shown in FIG. 2, the first outer frame top wall 111 may have a first top surface 111a. According to some embodiments of the present disclosure, the first top surface 111a of the first outer frame top wall 111 may be the uppermost surface of the first outer frame top wall 111. The first top surface 111*a* of the first outer frame top wall 111 may closely surround the opening 113 of the outer frame.

According to some embodiments of the present disclosure, the first terminal accommodation 122*a* may have an open structure. According to some embodiments of the present disclosure, the first terminal accommodation 122*a* may have a closed perforation structure. The first terminal accommodation 122*a* may accommodate the first terminal 51 of the circuit assembly 50.

The first terminal accommodation 122*a* may include a first surface 122*a*' and a second surface 122*a*". According to some embodiments of the present disclosure, the first surface 122*a*' of the first terminal accommodating portion 122*a* and the second surface 122*a*" of the first terminal accommodating portion 122*a* face in opposite directions.

According to some embodiments of the present disclosure, the first surface 122*a*' of the first terminal accommodating portion 122*a* may face the first terminal 51 of the circuit assembly 50, and the second surface 122*a*" of the first terminal accommodating portion 122*a* may face the first terminal 51 of the circuit assembly 50.

According to some embodiments of the present disclosure, the second terminal accommodation 122*b* may have an open structure. According to some embodiments of the present disclosure, the second terminal accommodation 122*b* may have a closed perforation structure. The second terminal accommodation 122*b* may accommodate the second terminal 52 of the circuit assembly 50.

The second terminal accommodation 122*b* may include a first surface 122*b*' and a second surface 122*b*". According to some embodiments of the present disclosure, the first surface 122*b*' of the second terminal accommodating portion 122*b* and the second surface 122*b*" of the second terminal accommodation 122*b* face in opposite directions.

According to some embodiments of the present disclosure, the first surface 122*b*' of the second terminal accommodating portion 122*b* may face the second terminal 52 of the circuit assembly 50, and the second surface 122*b*" of the second terminal accommodating portion 122*b* may face the second terminal 52 of the circuit assembly 50.

The first terminal 51 of the circuit assembly 50 may be exposed to the outside through the first opening portion 123*a*. The second terminal 52 of the circuit assembly 50 may be exposed to the outside through the second opening portion 123*b*.

The first opening portion 123*a* may have a first opening surface 123*a*'. The first opening surface 123*a*' of the first opening portion 123*a* may face the first terminal 51 of the circuit assembly 50.

According to some embodiments of the present disclosure, the first opening surface 123*a*' of the first opening portion 123*a* and the first surface 122*a*' of the first terminal accommodating portion 122*a* may face the same direction.

According to some embodiments of the present disclosure, the shortest distance S1 between the first opening surface 123*a*' of the first opening portion 123*a* and the first terminal 51 of the circuit assembly 50 may be greater than the shortest distance S2 between the first surface 122*a*' of the first terminal accommodating portion 122*a* the first terminal 51 of the circuit assembly 50.

Therefore, it may help the first terminal 51 of the circuit assembly 50 to connect with other elements, and it may help the circuit assembly 50 to dissipate heat. Furthermore, it is possible to prevent the first terminal 51 of the circuit assembly 50 from colliding with other elements when it is impacted, thereby avoiding the first terminal 51 of the circuit assembly 50 from being damaged.

The second opening portion 123*b* may have a second opening surface 123*b*'. The second opening surface 123*b*' of the second opening portion 123*b* may face the second terminal 52 of the circuit assembly 50.

According to some embodiments of the present disclosure, the second opening surface 123*b*' of the second opening portion 123*b* and the first surface 122*b*' of the second terminal accommodating portion 122*b* may face the same direction.

According to some embodiments of the present disclosure, the shortest distance S3 between the second opening surface 123*b*' of the second opening portion 123*b* and the second terminal 52 of the circuit assembly 50 may be greater than the shortest distance S4 between the first surface 122*b*' of the second terminal accommodating portion 122*b* and the second terminal 52 of the circuit assembly 50.

Therefore, it may help the second terminal 52 of the circuit assembly 50 to connect with other elements, and it may help the circuit assembly 50 to dissipate heat. Furthermore, it is possible to prevent the second terminal 52 of the circuit assembly 50 from colliding with other elements when it is impacted, thereby avoiding the second terminal 52 of the circuit assembly 50 from being damaged.

The first supporting portion 124*a* may have a first supporting portion surface 124*a*', and the first supporting portion surface 124*a*' of the first supporting portion 124*a* may face the first terminal 51 of the circuit assembly 50.

The first supporting portion 124*a* may protrude from the first opening portion 123*a*. Accordingly, the first supporting portion 124*a* may support the first terminal 51 of the circuit assembly 50 to prevent the excessive deformation of the first terminal 51 of the circuit assembly 50.

According to some embodiments of the present disclosure, the first supporting portion surface 124*a*' at least not partially overlap the second surface 122*a*" of the first terminal accommodation 122*a* when viewed along a direction that is perpendicular to the first supporting portion surface 124*a*'.

According to some embodiments of the present disclosure, the shortest distance S1 between the first opening surface 123*a*' of the first opening portion 123*a* and the first terminal 51 of the circuit assembly 50 is greater than the shortest distance S5 between the first supporting portion surface 124*a*' of the first supporting portion 124*a* and the first terminal 51 of the circuit assembly 50.

According to some embodiments of the present disclosure, the shortest distance S5 between the first supporting portion surface 124*a*' of the first supporting portion 124*a* and the first terminal 51 of the circuit assembly 50 is greater than the shortest distance S2 between the first surface 122*a*' of the first terminal accommodating portion 122*a* the first terminal 51 of the circuit assembly 50.

According to some embodiments of the present disclosure, the first terminal 51 of the circuit assembly 50 may be fixedly connected to the first supporting portion surface 124*a*' of the first supporting portion 124*a* via the connecting element 60.

According to some embodiments of the present disclosure, the connecting element 60 may be in direct contact with the first surface 122*a*' of the first terminal accommodation 122*a*.

According to some embodiments of the present disclosure, the connecting element 60 is not in direct contact with the first opening surface 123*a*' of the first opening portion 123*a*.

In this way, the first terminal 51 of the circuit assembly 50 may be more stable, and the reliability of the optical element driving mechanism 100 may be improved.

The second supporting portion 124*b* may have a second supporting surface 124*b*', and the second supporting surface 124*b*' of the second supporting portion 124*b* may face the second terminal 52 of the circuit assembly 50.

The second supporting portion 124*b* may protrude from the second opening portion 123*b*. Thus, the second supporting portion 124*b* may support the second terminal 52 of the circuit assembly 50 to prevent the excessive deformation of the second terminal 52 of the circuit assembly 50.

According to some embodiments of the present disclosure, the second supporting surface 124*b*' of the second supporting portion 124*b* at least not partially overlap the second surface 122*b*" of the second terminal accommodating portion 122*b* when viewed along a direction that is perpendicular to the second supporting surface 124*b*'.

According to some embodiments of the present disclosure, the shortest distance S3 between the second opening surface 123*b*' of the second opening portion 123*b* and the second terminal 52 of the circuit assembly 50 may be greater than the shortest distance S6 between the second supporting surface 124*b*' of the second supporting portion 124*b* and the second terminal 52 of the circuit assembly 50.

According to some embodiments of the present disclosure, the shortest distance S6 between the second supporting surface 124*b*' of the second supporting portion 124*b* and the second terminal 52 of the circuit assembly 50 is greater than the shortest distance S4 between the first surface 122*b*' of the second terminal accommodating portion 122*b* and the second terminal 52 of the circuit assembly 50.

According to some embodiments of the present disclosure, the second terminal 52 of the circuit assembly 50 may be fixedly connected to the second supporting surface 124*b*' of the second supporting portion 124*b* via the connecting element 60.

According to some embodiments of the present disclosure, the connecting element 60 may be in direct contact with the first surface 122*b*' of the second terminal accommodation 122*b*.

According to some embodiments of the present disclosure, the connecting element 60 is not in direct contact with the second opening surface 123*b*' of the second opening portion 123*b*.

In this way, the second terminal 52 of the circuit assembly 50 may be more stable, and the reliability of the optical element driving mechanism 100 may be improved.

The first spacing structure 125*a* may be located between the first terminal accommodating portion 122*a* and the second terminal accommodating portion 122*b*, so as to prevent the first terminal 51 and the second terminal 52 of the circuit assembly 50 from contacting and causing a short circuit.

The second spacing structure 125*b* may be located between the first terminal accommodating portion 122*a* and the second terminal accommodating portion 122*b*, so as to prevent the first terminal 51 and the second terminal 52 of the circuit assembly 50 from contacting and causing a short circuit.

The third spacing structures 125*c* may be located between the first terminal 51 and the second terminal 52 of the circuit assembly 50, so as to prevent the first terminal 51 and the second terminal 52 of the circuit assembly 50 from contacting and causing a short circuit.

The fourth spacing structures 125*d* may be located between the first terminal 51 and the second terminal 52 of the circuit assembly 50, so as to prevent the first terminal 51 and the second terminal 52 of the circuit assembly 50 from contacting and causing a short circuit.

According to some embodiments of the present disclosure, the first spacing structure 125*a* may protrude from the first opening surface 123*a*' of the first opening portion 123*a*.

According to some embodiments of the present disclosure, the second spacing structure 125*b* may protrude from the first surface 122*a*' of the first terminal accommodation 122*a*, and the connecting element 60 may be in direct contact with the second spacing structure 125*b*.

According to some embodiments of the present disclosure, the third spacing structure 125*c* may protrude from the second spacing structure 125*b*, and the connecting element 60 may be in direct contact with the third spacing structure 125*c*.

According to some embodiments of the present disclosure, the fourth spacing structure 125*d* may extend from the third spacing structure 125*c*, and the fourth spacing structure 125*d* may extend to the first magnetic element supporting block 127*a*.

The first positioning structure 126*a* may position the first terminal 51 of the circuit assembly 50. According to some embodiments of the present disclosure, the first positioning structure 126*a* may have a protruding structure. Moreover, the connecting element 60 may be in direct contact with the first positioning structure 126*a* and the first terminal 51 of the circuit assembly 50.

For example, the first positioning structure 126*a* may extend upwardly from the base body 121 and pass through the first terminal 51 of the circuit assembly 50 to fix the first terminal 51 of the circuit assembly 50 to the base body 121.

The first positioning structure 126*a* may position the first terminal 51 of the circuit assembly 50. According to some embodiments of the present disclosure, the first positioning structure 126*a* may have a protruding structure. Moreover, the connecting element 60 may be in direct contact with the first positioning structure 126*a* and the first terminal 51 of the circuit assembly 50.

For example, the first positioning structure 126*a* may extend upwardly from the base body 121 and pass through the first terminal 51 of the circuit assembly 50 to fix the first terminal 51 of the circuit assembly 50 to the base body 121.

According to some embodiments of the present disclosure, the first positioning structure 126*a* may be a recess. The first terminal 51 of the circuit assembly 50 may extend downward into the recess to fix the first terminal 51 of the circuit assembly 50 to the base body 121.

The second positioning structure 126*b* may position the second terminal 52 of the circuit assembly 50. According to some embodiments of the present disclosure, the second positioning structure 126*b* may have a protruding structure. Moreover, the connecting element 60 may be in direct contact with the second positioning structure 126*b* and the second terminal 52 of the circuit assembly 50.

For example, the second positioning structure 126*b* may extend upwardly from the base body 121 and pass through the second terminal 52 of the circuit assembly 50 to fix the second terminal 52 of the circuit assembly 50 to the base body 121.

The second positioning structure 126*b* may position the second terminal 52 of the circuit assembly 50. According to some embodiments of the present disclosure, the second positioning structure 126*b* may have a protruding structure. Moreover, the connecting element 60 may be in direct contact with the second positioning structure 126*b* and the second terminal 52 of the circuit assembly 50.

For example, the second positioning structure 126b may extend upwardly from the base body 121 and pass through the second terminal 52 of the circuit assembly 50 to fix the second terminal 52 of the circuit assembly 50 to the base body 121.

According to some embodiments of the present disclosure, the second positioning structure 126b may be a recess. The second terminal 52 of the circuit assembly 50 may extend downward into the recess to fix the second terminal 52 of the circuit assembly 50 to the base body 121.

According to some embodiments of the present disclosure, the first magnetic element supporting block 127a may be in contact with the fourth spacing structure 125d, and the first magnetic element supporting block 127a may correspond to the first magnetic element 31.

According to some embodiments of the present disclosure, the first magnetic element supporting block 127a may at least partially overlap the first magnetic element 31 when viewed along the main axis M.

According to some embodiments of the present disclosure, the second magnetic element supporting block 127b may correspond to the second magnetic element 32. According to some embodiments of the present disclosure, the second magnetic element supporting block 127b at least partially overlap the second magnetic element 32 when viewed along the main axis M.

According to some embodiments of the present disclosure, the width W1 of the first magnetic element supporting block 127a may be smaller than the width W2 of the second magnetic element supporting block 127b.

According to some embodiments of the present disclosure, the distance S7 between the first magnetic element supporting block 127a and the outer frame sidewall 112 of the outer frame 11 may be greater than the distance S8 between the second magnetic element supporting block 127b and the outer frame sidewall 112 of the outer frame 11.

According to some embodiments of the present disclosure, the third magnetic element supporting block 127c may correspond to the third magnetic element 33. According to some embodiments of the present disclosure, the third magnetic element supporting block 127c at least partially overlap the third magnetic element 33 when viewed along the main axis M.

According to some embodiments of the present disclosure, the width W1 of the first magnetic element supporting block 127a may be smaller than the width W3 of the third magnetic element supporting block 127c.

According to some embodiments of the present disclosure, the distance S7 between the first magnetic element supporting block 127a and the outer frame sidewall 112 of the outer frame 11 may be greater than the distance S9 between the third magnetic element supporting block 127c and the outer frame sidewall 112 of the outer frame 11.

According to some embodiments of the present disclosure, the fourth magnetic element supporting block 127d may correspond to the fourth magnetic element 34. According to some embodiments of the present disclosure, the fourth magnetic element supporting block 127d at least partially overlap the fourth magnetic element 34 when viewed along the main axis M.

According to some embodiments of the present disclosure, the width W1 of the first magnetic element supporting block 127a may be smaller than the width W4 of the fourth magnetic element supporting block 127d.

According to some embodiments of the present disclosure, the distance S7 between the first magnetic element supporting block 127a and the outer frame sidewall 112 of the outer frame 11 may be greater than the distance S10 between the fourth magnetic element supporting block 127d and the outer frame sidewall 112 of the outer frame 11.

In this way, the internal space of the optical element driving mechanism 100 may be used more effectively, and the effect of miniaturizing the optical element driving mechanism 100 may be achieved.

The driving assembly corresponding structure 128 may correspond to the driving assembly 30, and the driving assembly corresponding structure 128 may protrude from the base body 121. The connecting element 60 may be in direct contact with the driving assembly corresponding structure 128.

Figure 8:
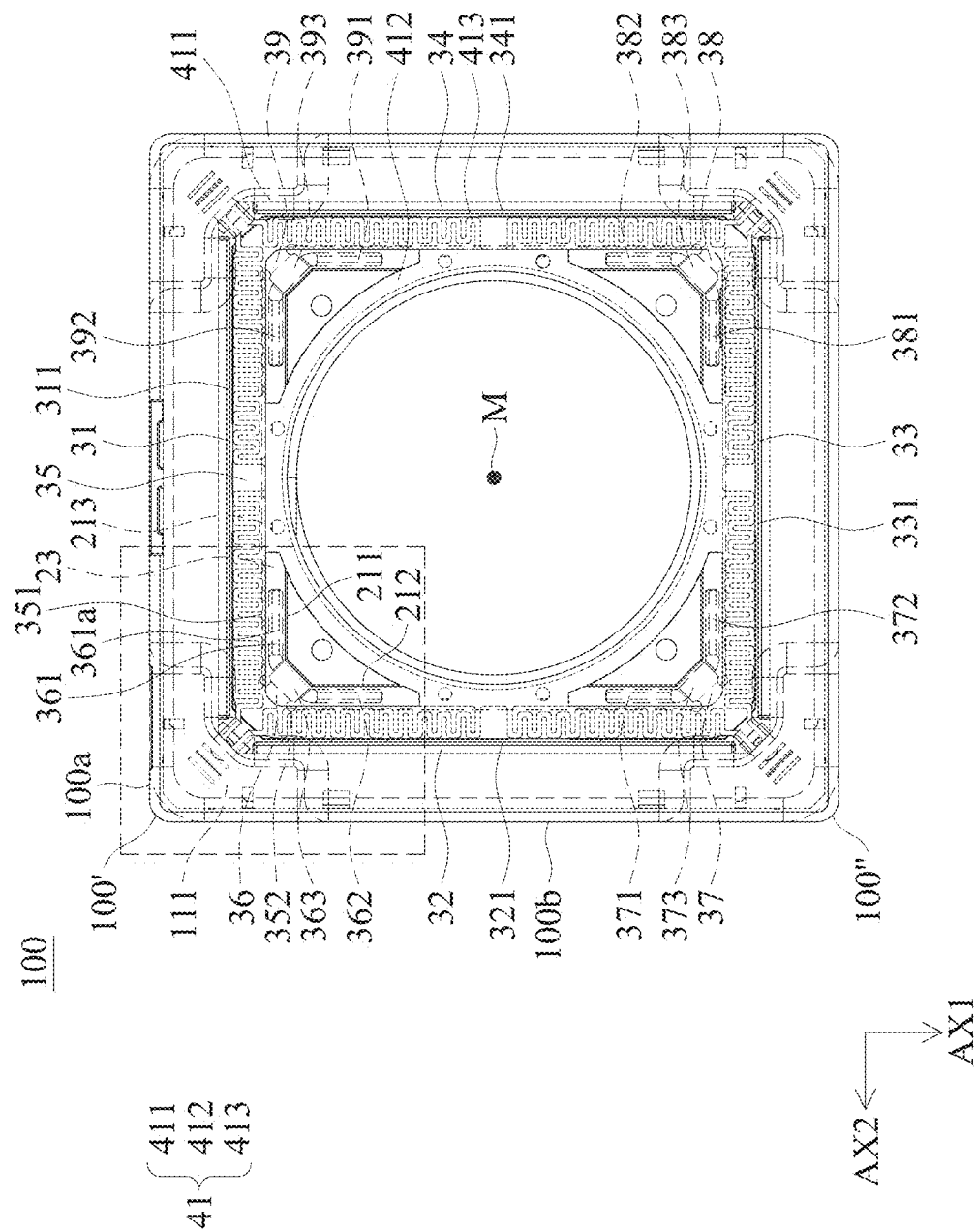
FIG. 8 is a schematic view of the optical element driving mechanism according to some embodiments of the present disclosure, in which the outer frame and the first elastic element are shown as dashed lines.
Figure 9:
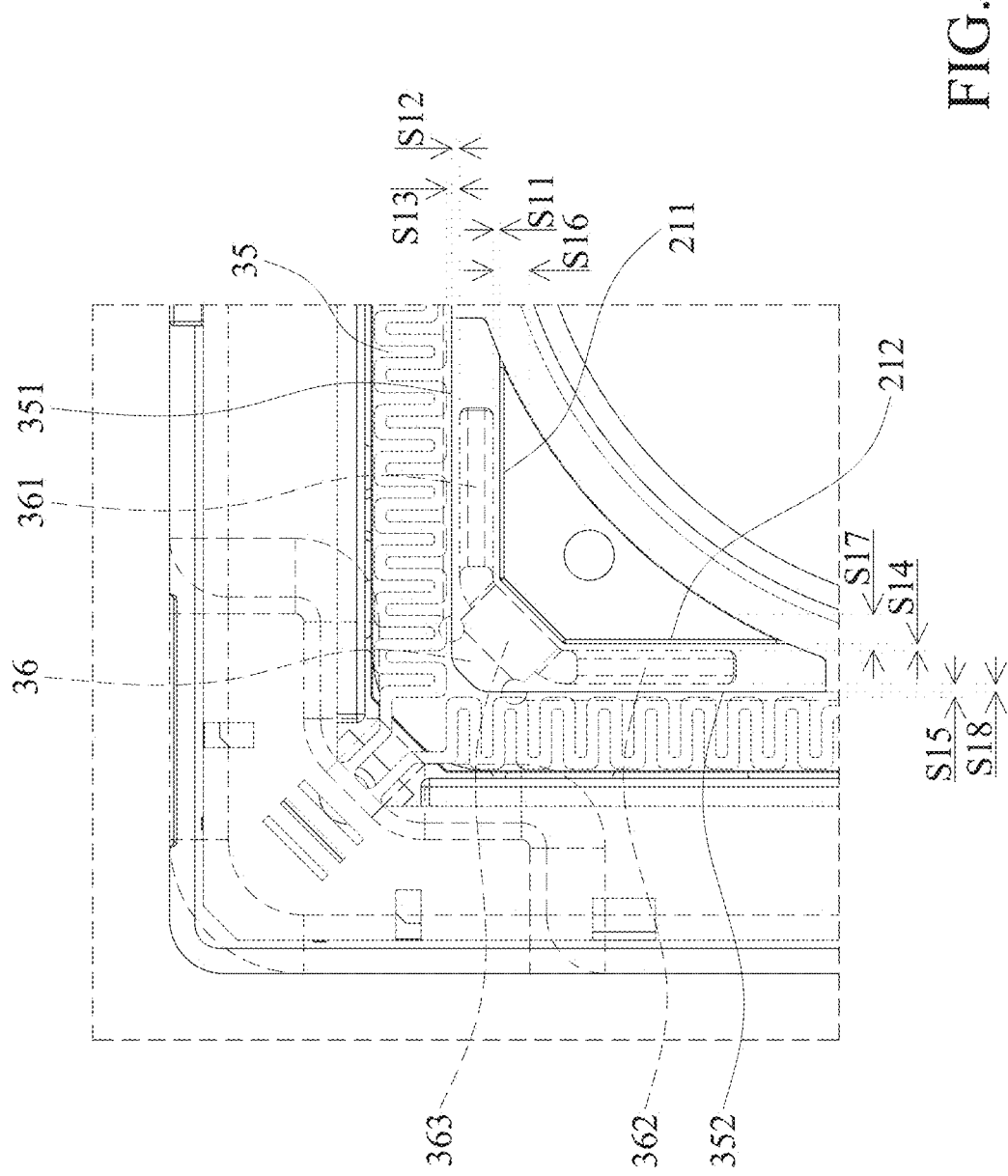
FIG. 9 is an enlarged schematic view of the optical element driving mechanism according to some embodiments of the present disclosure, wherein the outer frame and the first elastic element shown as dashed lines.
Figure 10:
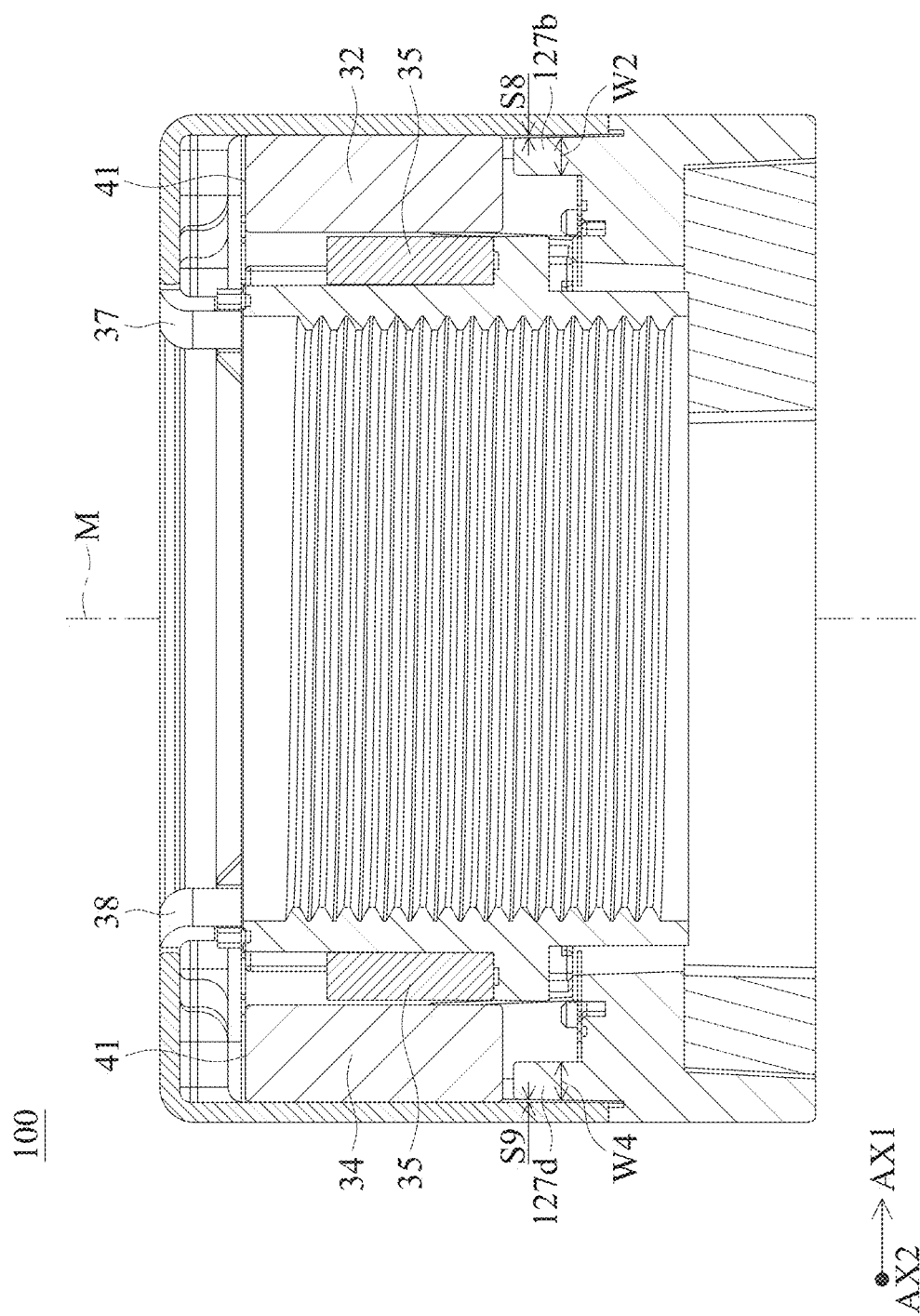
FIG. 10 is a cross-sectional view of the optical element driving mechanism along line A-A' of FIG. 2, according to some embodiments of the present disclosure.
Figure 11:
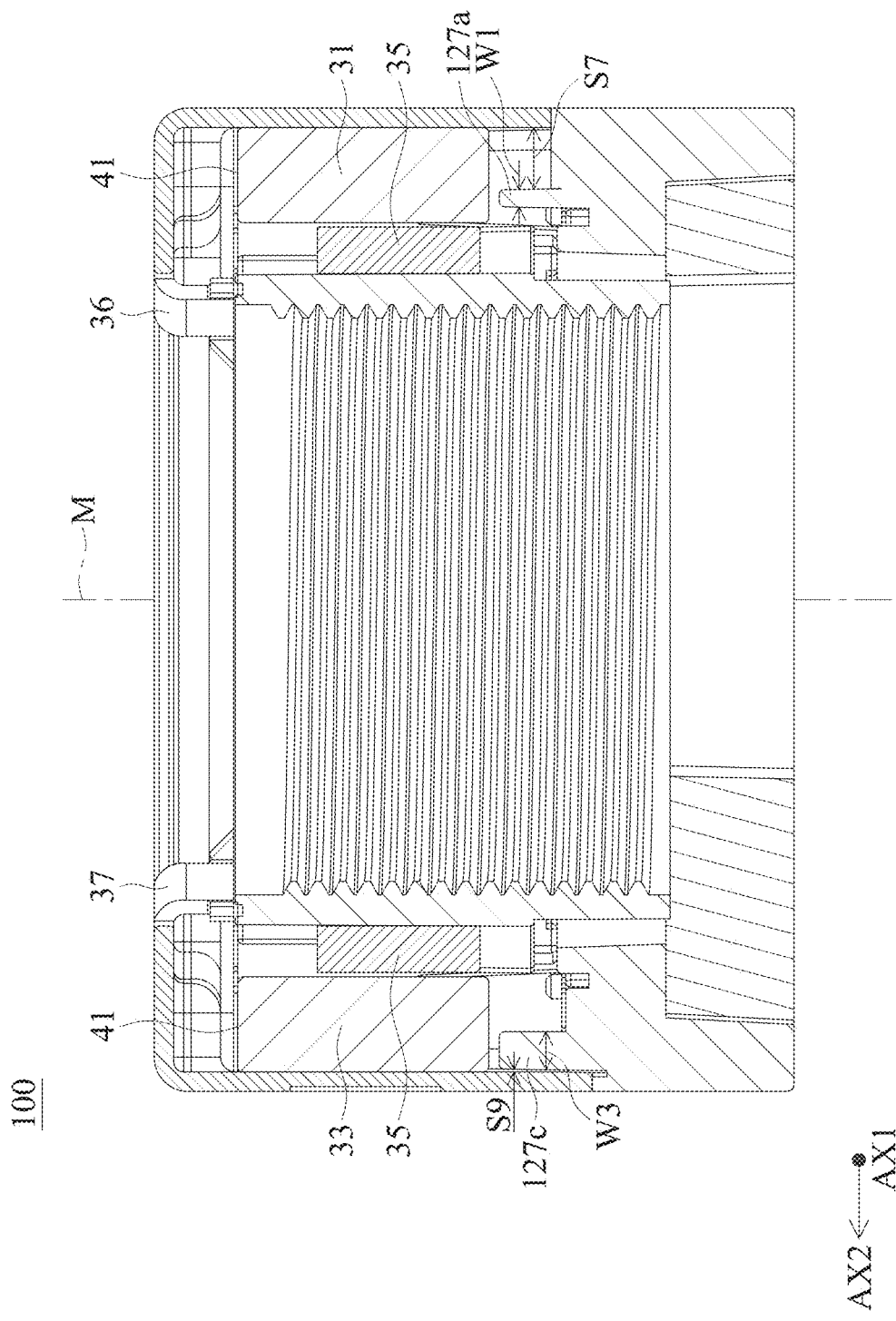
FIG. 11 is a cross-sectional view of the optical element driving mechanism along line B-B' of FIG. 2, according to some embodiments of the present disclosure.

Please refer to FIG. 8, FIG. 9, FIG. 10, and FIG. 11. FIG. 8 is a schematic view of the optical element driving mechanism 100 according to some embodiments of the present disclosure, in which the outer frame 11 and the first elastic element 41 are shown as dashed lines; FIG. 9 is an enlarged schematic view of the optical element driving mechanism 100 according to some embodiments of the present disclosure, wherein the outer frame 11 and the first elastic element 41 shown as dashed lines; FIG. 10 is a cross-sectional view of the optical element driving mechanism 100 along line A-A' of FIG. 2, according to some embodiments of the present disclosure; FIG. 11 is a cross-sectional view of the optical element driving mechanism 100 along line B-B' of FIG. 2, according to some embodiments of the present disclosure.

According to some embodiments of the present disclosure, the movable part body 21 may have a first movable part body surface 211, a second movable part body surface 212, and a third movable part body surface 213. According to some embodiments of the present disclosure, the first movable part body surface 211 and the second movable part body surface 212 may be parallel to the main axis M.

The driving assembly fixing structure 22 may extend outward along a direction that is perpendicular to the main axis M from the movable body 21.

According to some embodiments of the present disclosure, the movable part accommodation 23 may have a recessed structure, and the movable part accommodation 23 may accommodate the first reinforcement element 36, the second reinforcement element 37, the third reinforcement element 38, and the fourth reinforcement element 39. According to some embodiments of the present disclosure, the movable part accommodation 23 may be formed by recessing the movable part body 21.

According to some embodiments of the present disclosure, the first magnetic element 31, the second magnetic element 32, the third magnetic element 33, and the fourth magnetic element 34 correspond to the driving coil 35.

According to some embodiments of the present disclosure, the first magnetic element 31 is fixed relative to the first reinforcement element 36. The second magnetic element 32 is fixed relative to the second reinforcement element 37. The third magnetic element 33 is fixed relative to the second reinforcement element 38. The fourth magnetic element 34 is fixed relative to the fourth reinforcement element 39.

According to some embodiments of the present disclosure, the first magnetic element 31 may be located at the first side 100a of the optical element driving mechanism 100 when viewed along the main axis M.

According to some embodiments of the present disclosure, the first magnetic element 31 may have a first magnetic element surface 311, the first magnetic element surface 311 may have a planar structure, and the first magnetic element surface 311 may face the driving coil 35. The first magnetic element surface 311 may be perpendicular to the second axis AX2.

According to some embodiments of the present disclosure, the second magnetic element 32 may have a second magnetic element surface 321, and the second magnetic element surface 321 may face the movable part 20. The second magnetic element surface 321 may be perpendicular to the first axis AX1.

According to some embodiments of the present disclosure, the third magnetic element 33 may have a third magnetic element surface 331, and the third magnetic element surface 331 may face the movable part 20. The third magnetic element surface 331 may be perpendicular to the second axis AX2.

According to some embodiments of the present disclosure, the fourth magnetic element 34 may have a fourth magnetic element surface 341, and the fourth magnetic element surface 341 may face the movable part 20. The fourth magnetic element surface 341 may be perpendicular to the first axis AX1.

According to some embodiments of the present disclosure, the driving coil 35 may be fixedly arranged on the driving assembly fixing structure 22, and the driving coil 35 may move relative to the first reinforcement element 36.

The driving coil 35 may have a first driving coil surface 351 and a second driving coil surface 352. The first movable part body surface 211 and the second movable part body surface 212 of the movable part body 21, and the first driving coil surface 351 and the second driving coil surface 352 of the driving coil 35, and the movable part body 21 form the movable part accommodation 23.

According to some embodiments of the present disclosure, the first driving coil surface 351 and the second driving coil surface 352 may be parallel to the main axis M.

According to some embodiments of the present disclosure, the first movable part body surface 211 and the first driving coil surface 351 may face each other and may be parallel to each other.

According to some embodiments of the present disclosure, the second movable part body surface 212 and the second driving coil surface 352 may face each other and may be parallel to each other.

According to some embodiments of the present disclosure, the movable part body surface 213 may abut the second driving coil surface 352. According to some embodiments of the present disclosure, there may be a gap between the third movable part body surface 213 and the second driving coil surface 352.

The first reinforcement element 36, the second reinforcement element 37, the third reinforcement element 38, and the fourth reinforcement element 39 may strengthen the driving force generated by the driving assembly 30.

The first reinforcement element 36 may be located at the first corner 100' of the optical element driving mechanism 100 when viewed along the main axis M.

The second reinforcement element 37 may be located at the second corner 100" of the optical element driving mechanism 100 when viewed along the main axis M.

The first reinforcement element 36, the second reinforcement element 37, the third reinforcement element 38, and the fourth reinforcement element 39 have an integrally formed structure with the outer frame 11.

That is, the first reinforcement element 36, the second reinforcement element 37, the third reinforcement element 38, and the fourth reinforcement element 39, and the outer frame 11 do not need to be fixed with glues or additional connecting manners.

The shortest distance S11 between the first reinforcement element 36 and the first movable part body surface 211 is shorter than the shortest distance S12 between the first reinforcement element 36 and the first driving coil surface 351.

According to some embodiments of the present disclosure, the first reinforcement element 36 may include a magnetically conductive material. The first reinforcement element 36 may include a first reinforcement portion 361, a second reinforcement portion 362, and a first connection portion 363.

According to some embodiments of the present disclosure, the first reinforcement portion 361 may have a plate-like structure, and the first reinforcement portion 361 may be parallel to the first magnetic element surface 311.

According to some embodiments of the present disclosure, the second reinforcement portion 362 may correspond to the second magnetic element 32. According to some embodiments of the present disclosure, the second reinforcement portion 362 may have a plate-like structure, and the second reinforcement portion 362 may be parallel to the second magnetic element surface 321.

According to some embodiments of the present disclosure, the driving coil 35 may be located between the first magnetic element 31 and the first reinforcement portion 361 when viewed along the first axis AX1 that is parallel to the first magnetic element surface 311.

According to some embodiments of the present disclosure, the driving coil 35 may at least partially overlap the first magnetic element 31 and the first reinforcement portion 361 when viewed along the second axis AX2 that is perpendicular to the first magnetic element surface 311.

The first connection portion 363 may connect to the first outer frame top wall 111, the first reinforcement portion 361, and the second reinforcement portion 362. The first reinforcement portion 361 of the first reinforcement element 36 may be connected to the first outer frame top wall 111 via the first connection portion 363.

According to some embodiments of the present disclosure, the first reinforcement portion 361 may protrude from the first connection portion 363. According to some embodiments of the present disclosure, the second reinforcement portion 362 may protrude from the first connection portion 363. According to some embodiments of the present disclosure, the first reinforcement portion 361 and the second reinforcement portion 362 are not parallel to each other.

According to some embodiments of the present disclosure, the first reinforcement portion surface 361a of the first reinforcement portion 361 may have a planar structure, and the first reinforcement portion surface 361a of the first reinforcement portion 361 may not be parallel or perpendicular to the main axis M.

According to some embodiments of the present disclosure, in the second axis AX2, the first reinforcement portion 361 and the second reinforcement portion 362 are at least partially overlapped.

According to some embodiments of the present disclosure, the first connection portion 363 has a plate-like structure, and the first connection portion 363 is not parallel to the first axis AX1 or the second axis AX2. According to some embodiments of the present disclosure, the first connection portion 363 may be perpendicular to the second axis AX2.

The second reinforcement element 37 may correspond to the second magnetic element 32. The second reinforcement element 37 may include a third reinforcement portion 371, a fourth reinforcement portion 372, and a second connection portion 373.

The third reinforcement portion 371 may correspond to the second magnetic element 32. The fourth reinforcement portion 372 may correspond to the third magnetic element 33. The third reinforcement portion 371 may have a plate-like structure, and the third reinforcement portion 371 may be parallel to the second magnetic element surface 321. The fourth reinforcement portion 372 may have a plate-like structure, and the fourth reinforcement portion 372 may be parallel to the third magnetic element surface 331.

The second connection portion 373 may connect to the first outer frame top wall 111, the third reinforcement portion 371, and the fourth reinforcement portion 372. The third reinforcement portion 371 of the second reinforcement element 37 may be connected to the first outer frame top wall 111 via the second connection portion 373.

According to some embodiments of the present disclosure, the third reinforcement portion 371 may protrude from the second connection portion 373. According to some embodiments of the present disclosure, the fourth reinforcement portion 372 may protrude from the second connection portion 373. According to some embodiments of the present disclosure, the third reinforcement portion 371 and the second connection portion 373 are not parallel to each other.

The third reinforcement element 38 may correspond to the third magnetic element 33. The third reinforcement element 38 may include a fifth reinforcement portion 381, a sixth reinforcement portion 382, and a third connection portion 383.

The fifth reinforcement portion 381 may correspond to the third magnetic element 33. The sixth reinforcement portion 382 may correspond to the fourth magnetic element 34. The fifth reinforcement portion 381 may have a plate-like structure, and the fifth reinforcement portion 381 may be parallel to the third magnetic element surface 331. The sixth reinforcement portion 382 may have a plate-like structure, and the sixth reinforcement portion 382 may be parallel to the fourth magnetic element surface 341.

The third connection portion 383 may connect to the first outer frame top wall 111, the fifth reinforcement portion 381, and the sixth reinforcement portion 382. The fifth reinforcement portion 381 of the third reinforcement element 38 may be connected to the first outer frame top wall 111 via the third connection portion 383.

According to some embodiments of the present disclosure, the fifth reinforcement portion 381 may protrude from the third connection portion 383. According to some embodiments of the present disclosure, the sixth reinforcement portion 382 may be formed by the third connection portion 383. According to some embodiments of the present disclosure, the fifth reinforcement portion 381 and the third connection portion 383 are not parallel to each other.

The fourth reinforcement element 39 may correspond to the fourth magnetic element 34. The fourth reinforcement element 39 may include a seventh reinforcement portion 391, an eighth reinforcement portion 392, and a fourth connection portion 393.

The seventh reinforcement portion 391 may correspond to the fourth magnetic element 34. The eighth reinforcement portion 392 may correspond to the first magnetic element 31. The seventh reinforcement portion 391 may have a plate-like structure, and the seventh reinforcement portion 391 may be parallel to the fourth magnetic element surface 341. The eighth reinforcement portion 392 may have a plate-like structure, and the eighth reinforcement portion 392 may be parallel to the first magnetic element surface 311.

The fourth connection portion 393 may connect to the first outer frame top wall 111, the seventh reinforcement portion 391, and the eighth reinforcement portion 392. The seventh reinforcement portion 391 of the fourth reinforcement element 39 may be connected to the first outer frame top wall 111 via the fourth connection portion 393.

According to some embodiments of the present disclosure, the seventh reinforcement portion 391 may protrude from the fourth connection portion 393. According to some embodiments of the present disclosure, the eighth reinforcement portion 392 may protrude from the fourth connection portion 393. According to some embodiments of the present disclosure, the seventh reinforcement portion 391 and the fourth connection portion 393 are not parallel to each other.

The first elastic element 41 may include a first elastic element outer portion 411, a first elastic element inner portion 412, and a first elastic element extension 413.

The first elastic element outer portion 411 may be connected to the fixed part 10. The first elastic element inner portion 412 may be connected to the movable part 20. The first elastic element extension 413 may connect the first elastic element outer portion 411 and the first elastic element inner portion.

According to some embodiments of the present disclosure, the first reinforcement element 36 and the first elastic element 41 at least partially overlap when viewed along the first axis AX1. According to some embodiments of the present disclosure, the first reinforcement element 36 and the first elastic element 41 at least partially overlap when viewed along the second axis AX2.

According to some embodiments of the present disclosure, in the second axis AX2, the shortest distance S12 between the first driving coil surface 351 and the first reinforcement element 36 is shorter than the shortest distance S13 between the first elastic element extension 413 and the first reinforcement element 36.

According to some embodiments of the present disclosure, in the first axis AX1, the shortest distance S14 between the second movable part body surface 212 and the first reinforcement element 36 is shorter than the shortest distance S15 between the first elastic element extension 413 and the first reinforcement element 36.

According to some embodiments of the present disclosure, in the second axis AX2, the shortest distance S11 between the first movable part body surface 211 and the first reinforcement element 36 is shorter than the shortest distance S16 between the first elastic element inner portion 412 and the first reinforcement element 36.

According to some embodiments of the present disclosure, in the first axis AX1, the shortest distance S14 between the second movable part body surface 212 and the first reinforcement element 36 is shorter than the shortest distance S17 between the first elastic element inner portion 412 and the first reinforcement element 36.

According to some embodiments of the present disclosure, the shortest distance (may be zero) between the third movable part body surface 213 and the first driving coil surface 351 is shorter than the shortest distance S12 between the first reinforcement element 36 and the first driving coil surface 351.

According to some embodiments of the present disclosure, the shortest distance (may be zero) between the third movable part body surface 213 and the first driving coil surface 352 is shorter than the shortest distance S18 between the first reinforcement element 36 and the second surface of the driving coil 352.

Figure 12:
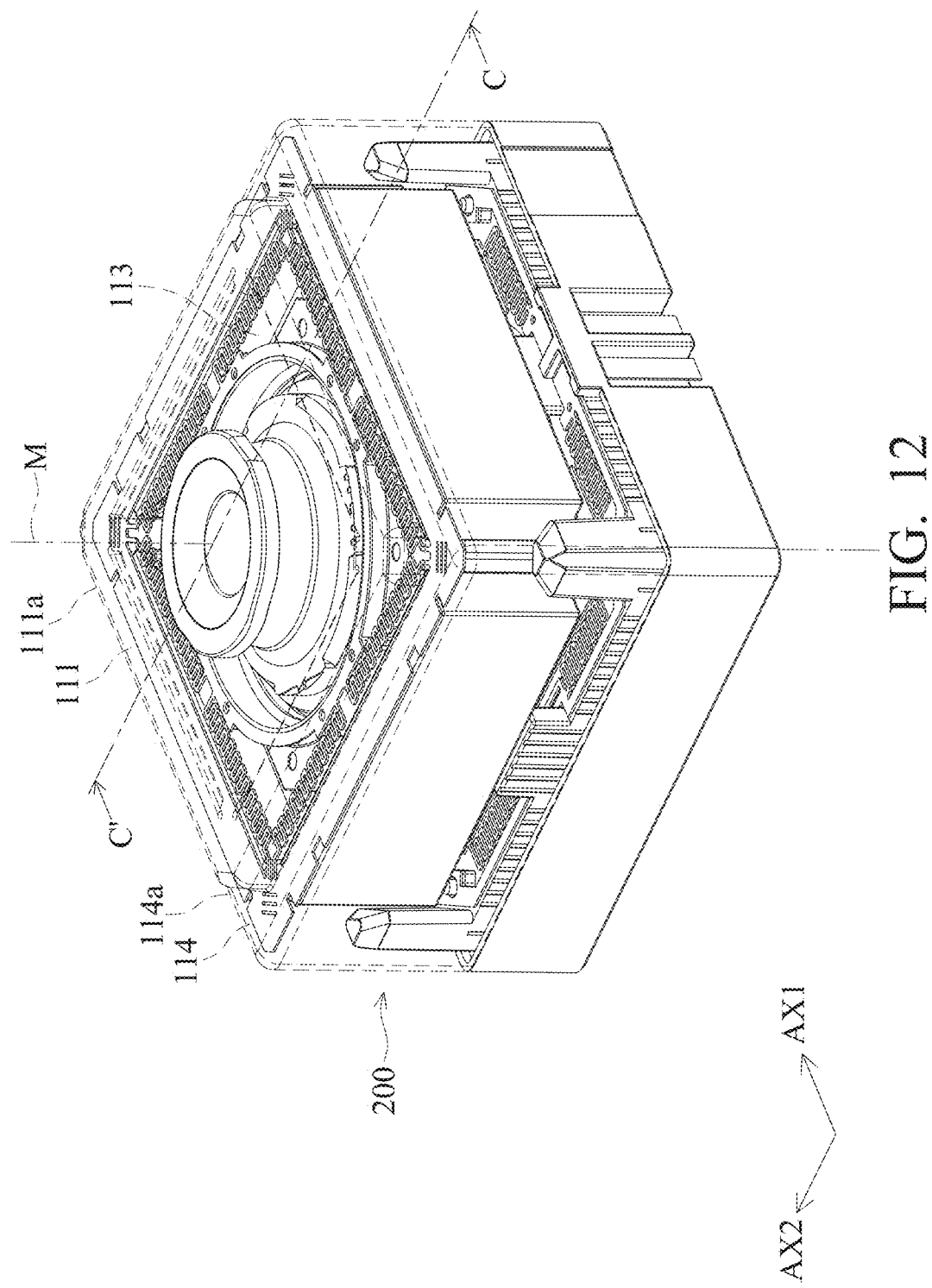
FIG. 12 is a schematic view of the optical element driving mechanism according to some embodiments of the present disclosure, in which the outer frame is shown as a dashed line.
Figure 13:
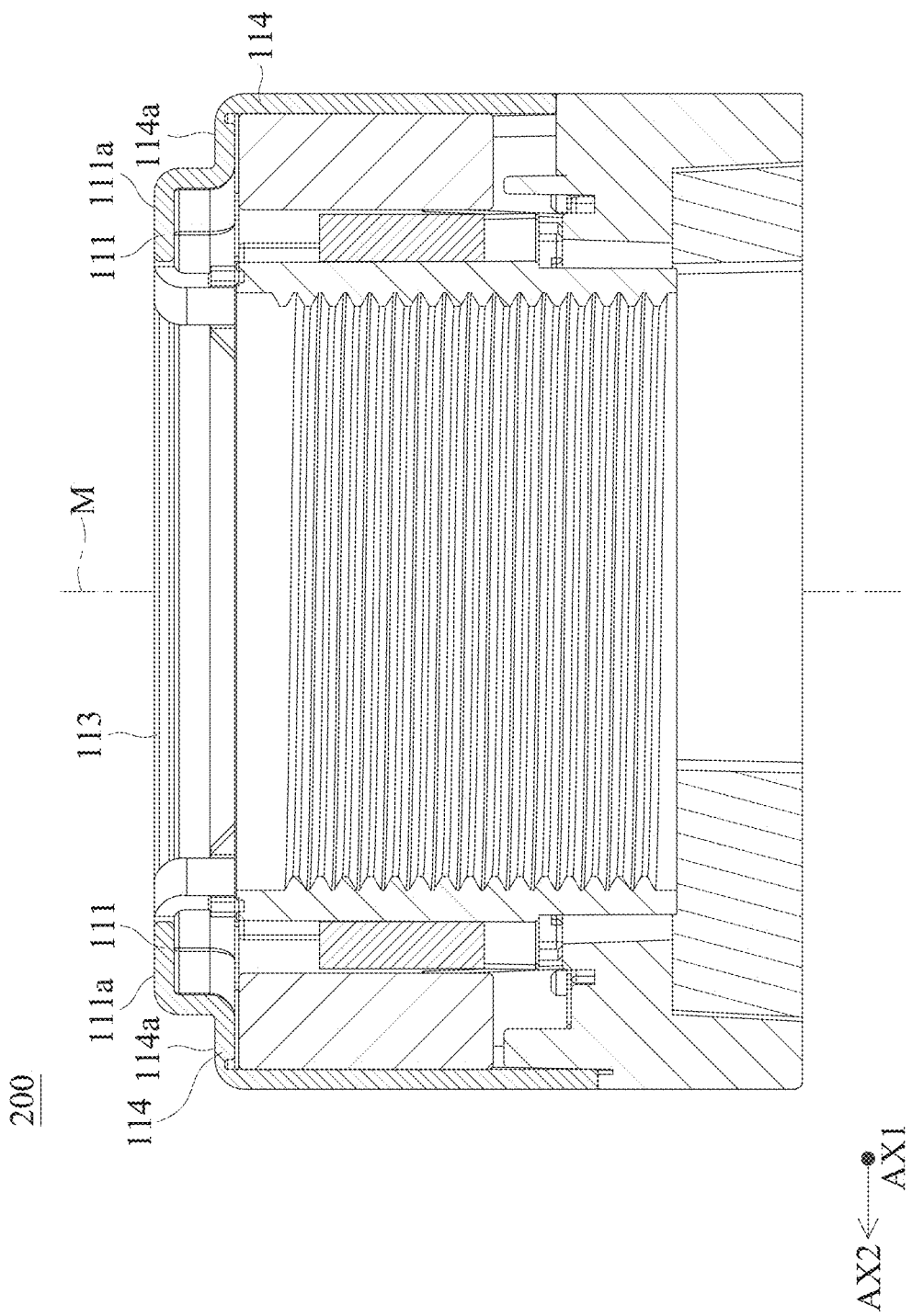
FIG. 13 is a cross-sectional view of the optical element driving mechanism along line C-C' of FIG. 12, according to some embodiments of the present disclosure.

Please refer to FIG. 12 and FIG. 13. FIG. 12 is a schematic view of the optical element driving mechanism 200 according to some embodiments of the present disclosure, in which the outer frame 11 is shown as a dashed line; FIG. 13 is a cross-sectional view of the optical element driving mechanism 200 along line C-C' of FIG. 12, according to some embodiments of the present disclosure.

The elements and arrangements of the optical element driving mechanism 200 are substantially the same as that of the optical element driving mechanism 100, so the description of the similar part will not be repeated herein.

The main difference between the optical element driving mechanism 200 and the optical element driving mechanism 100 is that the outer frame 11 of the optical element driving mechanism 200 may further include a second outer frame top wall 114. Moreover, the second outer frame top wall 114 may have a second top surface 114a.

According to some embodiments of the present disclosure, the second outer frame top wall 114 may have a plate-like structure, and the second outer frame top wall 114 may be parallel to the main axis M.

In the main axis M, there may be a non-zero distance between the first top surface 111a of the first outer frame top wall 111 and the second top surface 114a of the second outer frame top wall 114.

According to some embodiments of the present disclosure, the first top surface 111a of the first outer frame top wall 111 and the second top surface 114a of the second outer frame top wall 114 may face the same direction. The second top surface 114a of the second outer frame top wall 114 closely surround the outer frame opening 113. Moreover, the first outer frame top wall 111 may be interposed between the second outer frame top wall 114 and the outer frame opening 113.

In this way, the space of the optical element driving mechanism 200 may be effectively saved, and the effect of miniaturizing the optical element driving mechanism 200 may be achieved.

Figure 14:
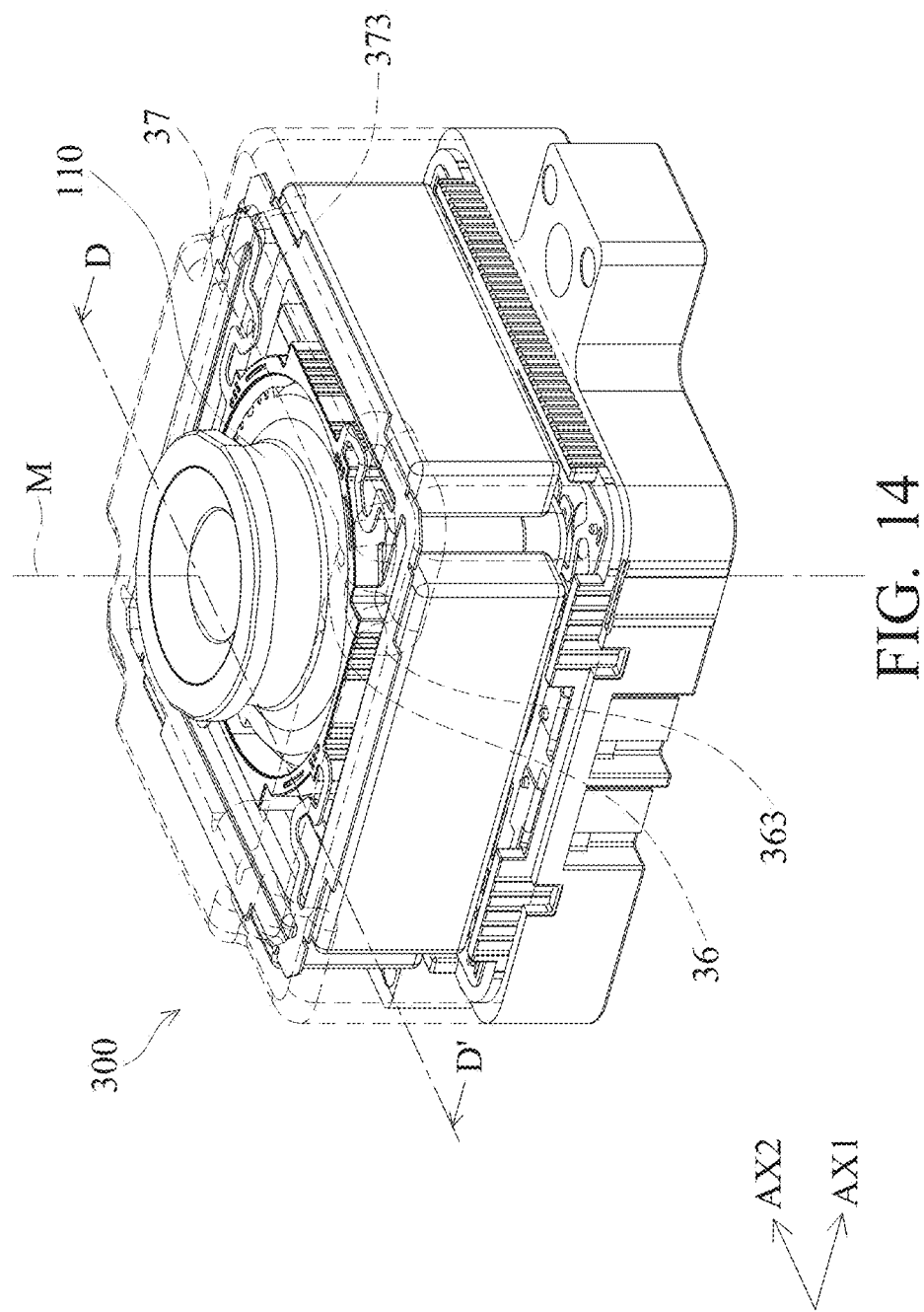
FIG. 14 is a schematic view of the optical element driving mechanism according to some embodiments of the present disclosure, in which the outer frame is shown as a dashed line.
Figure 15:
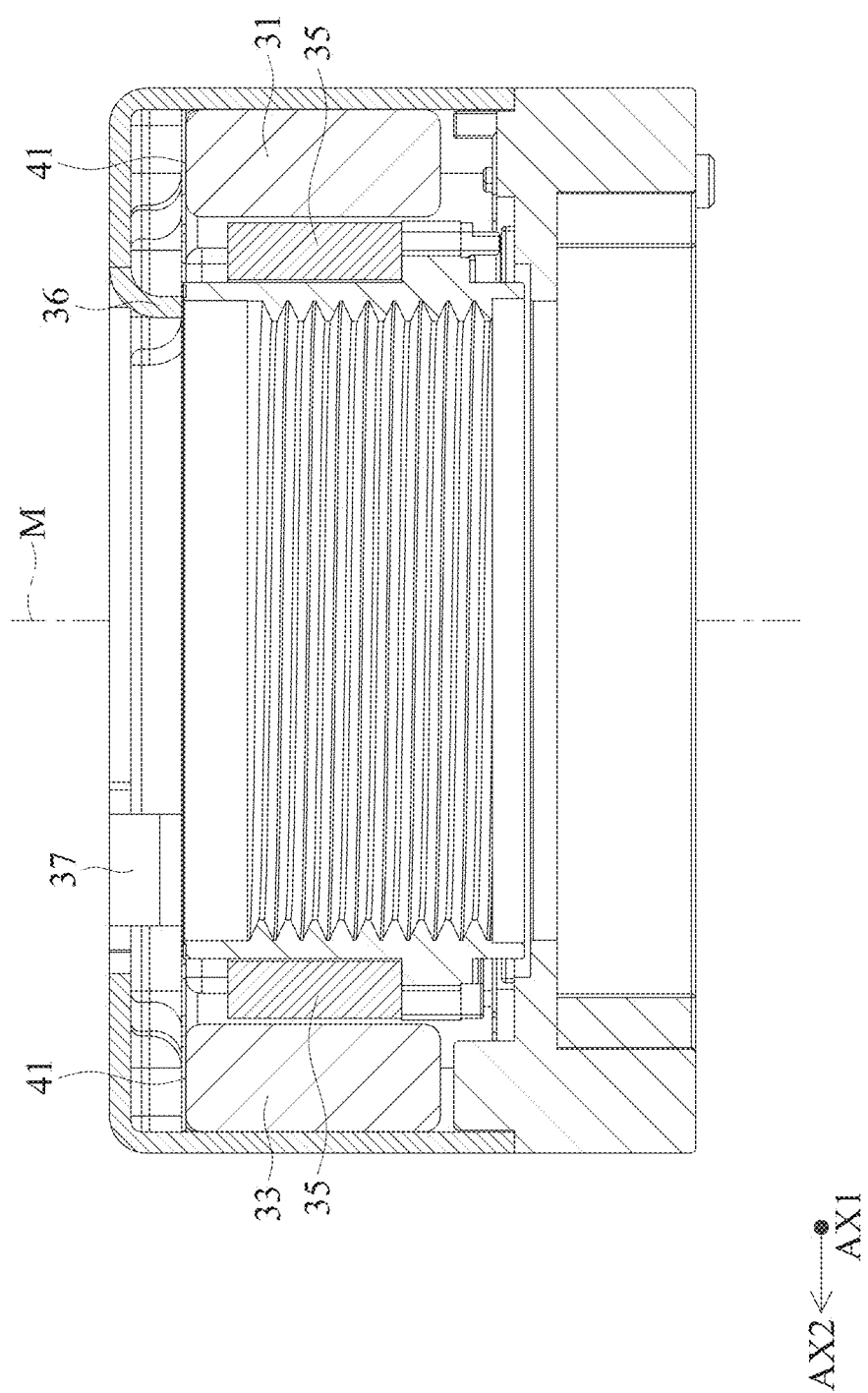
FIG. 15 is a cross-sectional view of the optical element driving mechanism along line D-D' of FIG. 14, according to some embodiments of the present disclosure.

Please refer to FIG. 14 and FIG. 15. FIG. 14 is a schematic view of the optical element driving mechanism 300 according to some embodiments of the present disclosure, in which the outer frame 11 is shown as a dashed line; FIG. 15 is a cross-sectional view of the optical element driving mechanism 300 along line D-D' of FIG. 14, according to some embodiments of the present disclosure.

The elements and arrangements of the optical element driving mechanism 300 are substantially the same as that of the optical element driving mechanism 100, so the description of the similar part will not be repeated herein.

The main difference between the optical element driving mechanism 200 and the optical element driving mechanism 100 is that the first reinforcement element 36 of the optical element driving mechanism 300 does not have a second reinforcement portion, and the second reinforcement element 37 of the optical element driving mechanism 300 does not have a fourth reinforcement portion.

According to some embodiments of the present disclosure, the first reinforcement element 36 and the second reinforcement element 37 of the optical element driving mechanism 300 may have an elongated shape.

The first reinforcement portion of the first reinforcement element 36 of the optical element driving mechanism 300 may be connected to the first outer frame top wall 111 via the first connection portion 363. The first connection portion 363 may have a plate-like structure, and the first connection portion 363 may be perpendicular to the second axis AX2.

According to some embodiments of the present disclosure, the second reinforcement element 37 of the optical element driving mechanism 300 may be connected to the first outer frame top wall 111 via the second connection portion 373. According to some embodiments of the present disclosure, the second connection portion 373 of the optical element driving mechanism 300 may have a plate-like structure and be perpendicular to the first axis AX1.

In this way, the elements of the optical element driving mechanism 300 may be effectively simplified, thereby making the optical element driving mechanism 300 easier to manufacture, and the manufacturing cost of the optical element driving mechanism 300 may be reduced.

In general, the optical element driving mechanism provided by the present disclosure may enhance the driving force generated by the driving assembly, thereby requiring a smaller current when driving the elements of the optical element mechanism, and a heavier element may also be driven. Furthermore, the optical element driving mechanism provided by the present disclosure may achieve the effect of miniaturization and may simplify the manufacture of the optical element driving mechanism. In addition, the optical element driving mechanism provided by the present disclosure may be easily connected with external elements, and has good stability and reliability.

Although embodiments of the present disclosure and their advantages have been described in detail, it should be understood that various changes, substitutions and alterations may be made herein without departing from the spirit and scope of the present disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a movable part, for connecting an optical element;
   a fixed part, comprising an outer frame and a base, wherein the movable part is movable relative to the fixed part;
   a driving assembly, for generating a driving force to drive the movable part to move relative to the fixed part;
   a circuit assembly, for connecting to an external circuit, wherein the circuit assembly comprises a first terminal; and a connecting element, wherein the outer frame is fixedly connected to the base via the connecting element,
wherein the base comprises:
a base body, having a plate-like structure and being perpendicular to a main axis;
a first terminal accommodating portion, for accommodating the first terminal; and
a first opening portion, wherein the first terminal is exposed to the outside through the first opening portion,
wherein the first terminal accommodating portion has an open structure, and
wherein the first terminal accommodating portion has a closed perforation structure.

2. The optical element driving mechanism as claimed in claim 1, wherein the first terminal accommodating portion further comprises a first surface facing the first terminal,
wherein the first terminal accommodating portion further comprises a second surface facing the first terminal, and
wherein the first surface and the second surface face in opposite directions.

3. The optical element driving mechanism as claimed in claim 2, wherein the first opening portion has a first opening surface facing the first terminal,
wherein the first opening surface and the first surface face the same direction,
wherein the shortest distance between the first opening surface and the first terminal is greater than the shortest distance between the first surface and the first terminal.

4. The optical element driving mechanism as claimed in claim 3, wherein the base further comprises a first supporting portion for supporting the first terminal,
wherein the first supporting portion has a first supporting portion surface facing the first terminal,
wherein the first supporting portion protrudes from the first opening portion,
wherein the first supporting portion surface does not at least partially overlap the second surface when viewed along a direction that is perpendicular to the first supporting portion surface.

5. The optical element driving mechanism as claimed in claim 4, wherein the shortest distance between the first opening surface and the first terminal is greater than the shortest distance between the first supporting portion surface and the first terminal,
wherein the shortest distance between the first supporting portion surface and the first terminal is greater than the shortest distance between the first surface and the first terminal.

6. The optical element driving mechanism as claimed in claim 5, wherein the first terminal is fixedly connected to the first supporting portion surface via the connecting element,
wherein the connecting element is in direct contact with the first surface,
wherein the connecting element is not in direct contact with the first opening surface.

7. The optical element driving mechanism as claimed in claim 3, wherein the circuit assembly further comprises a second terminal, and the base further comprises:
a second terminal accommodating portion, for accommodating the second terminal of the circuit assembly;
a second opening portion, wherein the second terminal is exposed to the outside through the second opening portion;
a first spacing structure, located between the first terminal accommodating portion and the second terminal accommodating portion; and
a second spacing structure, located between the first terminal accommodating portion and the second terminal accommodating portion.

8. The optical element driving mechanism as claimed in claim 7, wherein the first spacing structure protrudes from the first opening surface,
wherein the second spacing structure protrudes from the first surface,
wherein the connecting element is in direct contact with the second spacing structure.

9. The optical element driving mechanism as claimed in claim 8, wherein the base further comprises:
a first positioning structure, for positioning the first terminal;
a third spacing structure, located between the first terminal and the second terminal; and
a driving assembly corresponding structure, corresponding to the driving assembly and protruding from the base body.

10. The optical element driving mechanism as claimed in claim 9, wherein the connecting element is in direct contact with the first positioning structure,
wherein the first positioning structure has a protruding structure,
wherein the third spacing structure protrudes from the second spacing structure,
wherein the connecting element is in direct contact with the third spacing structure,
wherein the connecting element is in direct contact with the driving assembly corresponding structure.

11. The optical element driving mechanism as claimed in claim 10, wherein the outer frame further comprises a first outer frame top wall and an outer frame sidewall, wherein the first outer frame top wall has a plate-like structure, and the outer frame sidewall has a plate-like structure, wherein the first outer frame top wall and the outer frame sidewall are not parallel to each other.

12. The optical element driving mechanism as claimed in claim 11, wherein the base further comprises a fourth spacing structure, wherein the fourth spacing structure extends from the third spacing structure and is located between the first terminal and the second terminal.

13. The optical element driving mechanism as claimed in claim 12, wherein the base further comprises a first magnetic element supporting block, and the first magnetic element supporting block is in contact with the fourth spacing structure.

14. The optical element driving mechanism as claimed in claim 13, wherein the driving assembly comprises a first magnetic element, and the first magnetic element supporting block corresponds to the first magnetic element.

15. The optical element driving mechanism as claimed in claim 14, wherein the first magnetic element supporting block and the first magnetic element at least partially overlap when viewed along the main axis.

16. The optical element driving mechanism as claimed in claim 13, wherein the driving assembly further comprises a second magnetic element, and the base further comprises a second magnetic element supporting block,
wherein the second magnetic element supporting block corresponds to the second magnetic element.

17. The optical element driving mechanism as claimed in claim 16, wherein the second magnetic element supporting block and the second magnetic element at least partially overlap when viewed along the main axis.

18. The optical element driving mechanism as claimed in claim 16, wherein a width of the first magnetic element supporting block is shorter than a width of the second magnetic element supporting block.

19. The optical element driving mechanism as claimed in claim 16, wherein a distance between the first magnetic element supporting block and the outer frame sidewall is greater than a distance between the second magnetic element supporting block and outer frame sidewall.

* * * * *